United States Patent

White

[15] 3,654,773
[45] Apr. 11, 1972

[54] CONTROLLED TEMPERATURE BAIT BUCKET

[72] Inventor: John D. White, 923 Valley Ridge Drive, Birmingham, Ala. 35209

[22] Filed: Aug. 31, 1970

[21] Appl. No.: 68,408

[52] U.S. Cl.....................................62/371, 62/457, 62/383
[51] Int. Cl..........................................................F25d 3/08
[58] Field of Search............................62/372, 371, 457, 383

[56] References Cited

UNITED STATES PATENTS

| 1,186,418 | 6/1916 | Mischo | 62/457 |
| 2,216,202 | 10/1940 | Lake | 62/371 |
| 2,673,454 | 3/1954 | Gallie | 62/371 |

Primary Examiner—William J. Wye

[57] ABSTRACT

A controlled temperature bait bucket which includes, generally a small inner container with an insulated bottom and heat conducting sides within a large outer insulated bucket. The bucket is divided into two compartments by the container. The bait which is to be maintained at a controlled temperature is placed within the container, and the two compartments of the bucket are filled with a cooling agent. Fixed heat transfer means between the upper compartment and the container achieve initial cooling to optimum bait survival temperature and a manually controlled variable heat transfer means provides variable rate of heat transfer between the lower compartment and the container to maintain this temperature.

7 Claims, 3 Drawing Figures

INVENTOR

John D. White

CONTROLLED TEMPERATURE BAIT BUCKET

This invention relates, in general, to improved controlled temperature bait buckets.

It can be demonstrated that shrimp and other types of fish bait can be kept alive much longer at one specific optimum temperature for each type of bait. This temperature is generally lower than the surrounding water from which the bait is taken. The lower temperature reduces the bait's metabolism processes and, if the temperature is properly controlled, the bait can be kept alive for an unusually long length of time.

There are numerous different types of bait buckets available, however, only one of them has any means for regulating the temperature of the bait chamber.

U.S. Pat. No. 3,452,469 to White disclosed a two-compartment container with a shutter arrangement on the top of both inner and outer containers to regulate the heat transfer from coolant to bait and from bait to atmosphere. The bait is placed in the top compartment and ice is placed in the bottom compartment. Heat transfer is controlled by regulating the shutters on the top of each compartment. This bait bucket has a number of moving parts and is relatively expensive to manufacture.

Accordingly, an object of the present invention is to provide improved controlled temperature bait buckets.

Another object is to provide improved bait buckets having a construction whereby the temperature for the environment for the bait can be quickly achieved and can be maintained within an optimum temperature range for preserving the bait.

Still another object is to provide improved bait buckets of more simplified design and construction which can be inexpensively manufactured and assembled.

A still further object is to provide improved bait buckets having a construction whereby the rate of heat transfer from the bait container to the coolant container can be more easily regulated to maintain the temperature of the bait within the optimum range for keeping the bait alive for a longer period of time.

Other objects of the invention will in part be obvious and will in part appear hereinafter.

The above objectives are accomplished with a controlled temperature bucket which includes, generally, bait container with an insulated bottom and heat conducting sides within a large outer insulated bucket. The volume of the bucket not occupied by the bait container consists of two compartments to hold coolant. The two compartments within the bucket are filled with ice, dry ice, or other coolant, and the objects which are to be maintained at a controlled temperature are placed in the container. Initial cooling is achieved by fixed rate of heat transfer between the sides of the container and the coolant in the upper compartment of the bucket. After initial cooling, the rate of heat transfer to the bucket from the container is regulated by manually positioning the container within the bucket so as to control the opening between the lower and upper compartments of the bucket. In this fashion, the temperature of the objects can be maintained substantially constant for relatively long periods of time.

The invention accordingly comprises an article of manufacture possessing the features, properties, and the relation of elements which will be exemplified in the article hereinafter described and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawing.

Figures 1, 2, 3:
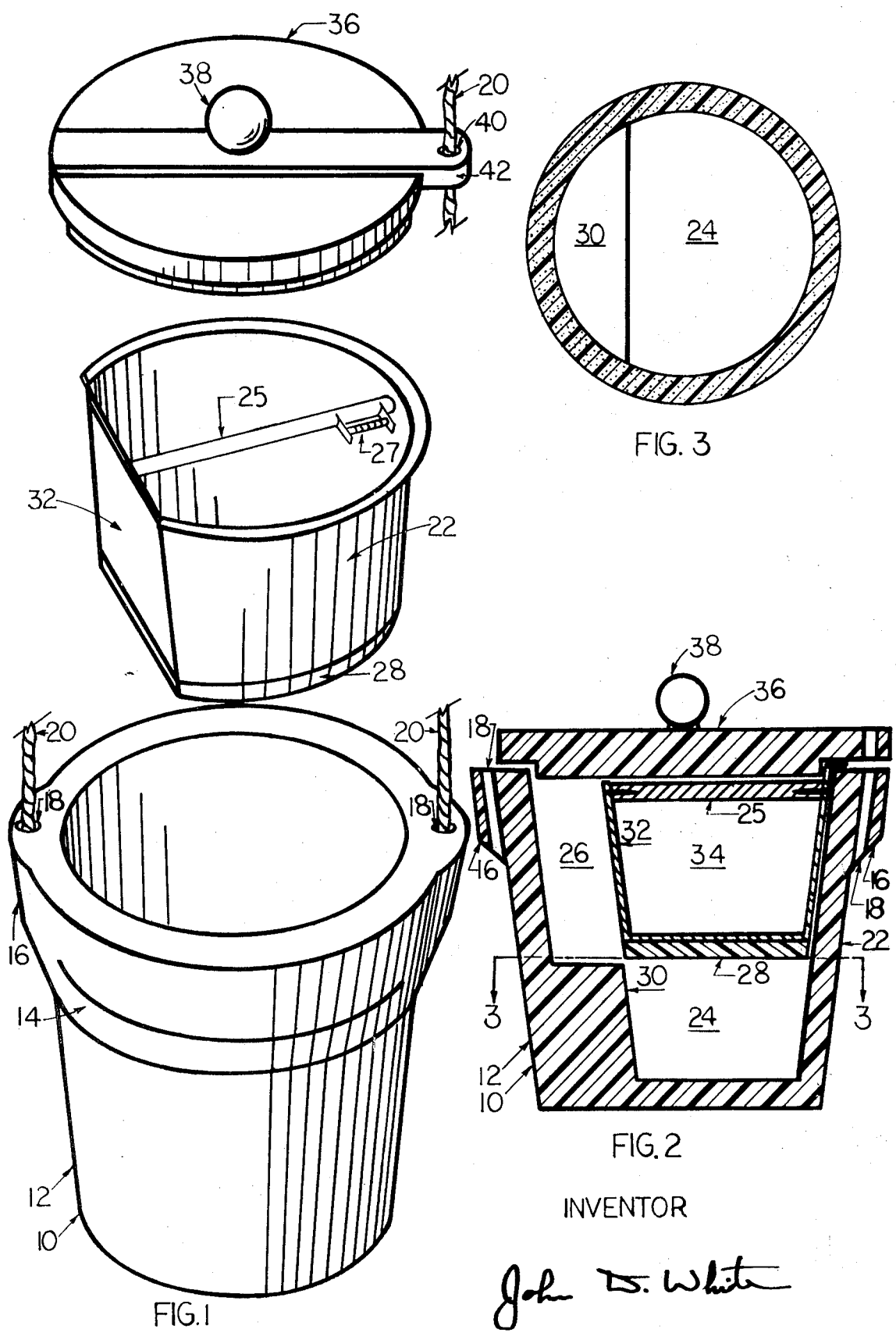
FIG. 1 is an exploded perspective view of a controlled temperature bucket or bait bucket exemplary of the present invention.
FIG. 2 is a sectional view of the controlled temperature bait bucket.
FIG. 3 is a sectional view taken along lines 3—3 of FIG. 2 illustrating the configuration of the lower cavity of the large container.

Referring now to the drawing, in FIG. 1, there is shown a controlled temperature bucket or bait bucket 10, hereinafter referred to generally as the bucket 10, having a large bucket 12, which is preferably moulded of an expanded plastic such as polystyrene, cellulose acetate or the like. The large bucket 12 has an annular thickened portion 14 about its top for additional strength and advantageously may have a pair of diametrically opposed arcuate shaped flanges 16 having apertures 18 therein for receiving a rope 20 for carrying the bucket 10. The ends of the rope 20 are extended through the apertures 18 and a knot (not shown) is tied in the ends thereof for securing the rope to the bucket. The bucket is fitted with a top 36 having a convenient handle 38 and attached to the bucket by the rope 20 through a hole 40 in a yoke 42.

An inner container 22 of sheet metal or of plastic such as polyethylene is removably contained, and free to rotate within the outer bucket 12. The outside diameter of the container 22 substantially corresponds to the inside diameter of the larger bucket 12, however, it is substantially shorter in length so as to provide a coolant compartment 24 below and within the large container 12. The cross-sectional area of the smaller container 22 is a segment of a circle, thereby providing additional coolant capacity in the complimentary circular segment cross-sectional area utilized as coolant compartment 26 within the large container 12.

The cross-sectional area of the bottom insulation 28 of the container is a segment of a circle whose diameter conforms substantially to the inside diameter of the large container 12 in which it fits snugly. The cross-sectional area of the lower compartment 24 is likewise a segment of a circle. The complimentary circular segment cross-sectional area shelf 30 of the large bucket 12 consists of expanded plastic, which can be moulded integrally as part of the body of the large container or can be moulded separately as a shelf-like disk (not shown) and affixed to a circular cross-section bucket by a suitable adhesive or by mechanical means.

Thus the bottom 28 of the container 22 which can be rotated within the bucket 12 and the shelf 30 in the bucket 12 form a shutter to control the rate of heat transfer from the bait container compartment 34 through the heat conducting side 32 to the coolant in the lower compartment 24.

By use of the handle 25, the container 22 can be rotated within the bucket 12 and the size of the opening between the heat conducting side 32 and the coolant compartment 24 can be adjusted for any desired position from full open to full closed. The rate of heat transfer is controlled thereby. A thermometer 27 is provided to aid in setting the desired shutter opening.

To use the bucket 10, the container 22 is positioned within the budget 12 so that the shutter is open and the compartments 24 and 26 are filled with ice cubes or other solid coolants. The compartment 34 of the container 22 is partially filled with water at atmospheric temperature (75° F. more or less) and the bait is placed in the container 22.

The size of the upper compartment 26 has been computed to hold sufficient coolant to reduce the temperature of the water within the container 22 to approximately 57° F. under average conditions. After all the ice in the upper cavity 26 has melted, the resultant water flows into the lower cavity 24. The water in the container compartment 34 is further reduced in temperature or maintained at the desired temperature by adjusting the shutter opening formed between the bottom insulation 28 of the container 22 and the shelf 30 in the bucket 12.

In a particular application, four dozen shrimp were placed in water in the bait compartment 34 and compartments 24 and 26 of the bucket 12 were filled with ice. The temperature of the water and the shrimp was reduced to and substantially maintained at approximately 57° F. by positionally adjusting the container 22 to regulate the rate of heat transfer from the water in the bait compartment 34 to the ice. The shrimp were preserved for 3 days in this fashion.

The bucket 12 can have a capacity of 8 quarts and, in such case, the container 22 preferably has a capacity of 3 quarts. The bucket 10, therefore, is generally of a size presently used, and is easily carried.

It may be further noted that although the bucket 10 makes an excellent bait bucket, its use is not limited to such an application, for its principle of operation can be used to maintain any object which is placed therein at a substantially controllable temperature. Accordingly, in broad concept, it is a controlled temperature bucket.

It will thus be seen that the objects set forth above, among those made apparent from the preceding description, are efficiently attained and, since certain changes may be made in the above article without departing from the scope of the invention, it is intended that all matter contained in the above description or shown in the accompanying drawing shall be interpreted as illustrative and not in a limiting sense.

Now that the invention has been described, I claim:

1. A controlled temperature bucket adapted to retain heat absorbing means such as a coolant and objects such as fish bait or other articles for controlling the temperature of said objects for a period of time comprising in combination: an outer insulated bucket having a lid for closing it; said bucket including shelf means positioned between top and bottom of said bucket and projecting from the side of said bucket; an inner container having heat conducting sides and an insulated bottom substantially co-extensive with the cross-sectional area of said bucket at the uppermost portion of said shelf; means for holding said container within said bucket with said container being adjustable positionably with respect to said shelf so as to provide an adjustable heat transfer opening between the lower portion of said bucket and the upper portion of said bucket.

2. The controlled temperature bucket of claim 1 wherein the cross-sectional area of said shelf defines a segment of a circle and wherein the bottom of said inner container defines the circular segment complementary with that of said shelf.

3. The controlled temperature bucket of claim 1 wherein the means for holding said container in said bucket consists of a lip at the top of said container along its circular perimeter which engages the top of said bucket.

4. The controlled temperature bucket of claim 1 wherein the bucket is comprised of a foamed plastic and the shelf is comprised of a foamed plastic moulded integrally with the bucket.

5. The controlled temperature bucket of claim 1 wherein the bucket is comprised of a foamed plastic and the shelf is comprised of rigid insulation in the form of a circular segment disk affixed to the side of the bucket by an adhesive.

6. The controlled temperature bucket in claim 1 wherein said inner container is moulded of a rigid plastic.

7. The controlled temperature bucket in claim 1 wherein the said inner container is constructed of sheet metal.

* * * * *